US006405223B1

United States Patent
Kelley et al.

(10) Patent No.: US 6,405,223 B1
(45) Date of Patent: Jun. 11, 2002

(54) SYSTEM FOR PERSONAL STORAGE OF DIFFERENT WEB SOURCE VERSIONS

(75) Inventors: Edward E. Kelley, Wappingers Falls; Christopher E. Cartier, Stony Point; Norman J. Dauerer, Hopewell Junction, all of NY (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/007,896

(22) Filed: Jan. 15, 1998

(51) Int. Cl.[7] .............................................. G06F 17/30
(52) U.S. Cl. ...................... 707/511; 707/203; 707/513
(58) Field of Search ................................ 707/511, 513, 707/200–203; 709/202

(56) References Cited

U.S. PATENT DOCUMENTS

| | | | | |
|---|---|---|---|---|
| 5,732,219 A | * | 3/1998 | Blumer et al. | 709/227 |
| 5,752,042 A | * | 5/1998 | Cole et al. | 395/712 |
| 5,793,964 A | * | 8/1998 | Rogers et al. | 709/202 |
| 5,877,759 A | * | 3/1999 | Bauer | 345/339 |
| 5,884,312 A | * | 3/1999 | Dustan et al. | 707/10 |
| 5,924,096 A | * | 7/1999 | Draper et al. | 707/10 |

OTHER PUBLICATIONS

Fred D. et al.; Tracking & Viewing Changes on the Web; AT&T Bell Laboratories; pp. 165–176, Jan. 1996.*

* cited by examiner

Primary Examiner—Hosain T. Alam
Assistant Examiner—Jean Bolte Fleurantin
(74) Attorney, Agent, or Firm—DeLio & Peterson, LLC; Kelly M. Reynolds; Margaret A. Pepper

(57) ABSTRACT

A system for storing web pages accessed from an inter- or intra-net source. The system comprises a client computer program storage device having stored thereon a first version of a desired web page from an inter- or intra-net source having assigned thereto a first version number and a second version of the desired web page from an inter- or intra-net source having assigned thereto a second version number. The storage device also includes a reference table which includes the first and second version numbers, such that the desired web page version may be accessed and viewed by the client computer by reference to the version numbers. The version numbers include designators of different files within the web page and designators of the version of the web page. Each of the stored web pages may include information such as a HTML source file for the web page, graphics imbedded in the HTML source file, javascript code, Java code and any other code referenced by the HTML source file. The client computer storage device may include a web browser having a bookmark file for storage of URL addresses of a plurality of web pages including the desired web page. The bookmark file is operable in conjunction with the reference table by the web browser to identify and access a selected version of the web pages.

20 Claims, 4 Drawing Sheets

SYSTEM FOR PERSONAL STORAGE OF DIFFERENT WEB SOURCE VERSIONS

BACKGROUND OF THE INVENTION

1. Field of the Invention

The present invention relates to computer programs and in particular to software for storing different versions of the same web page accessed from an inter- or intra-net source in a client computer program storage device.

2. Description of Related Art

In the course of accessing information by means of a web browser from a network, such as the Internet or a company or office intra-net, a user often finds a web page at a particular URL (Uniform Resource Locator) address that contains information the user would like to re-access. The user may then save the URL in the web browser's bookmark file of often-accessed web pages for later re-access and retrieval, as desired.

However, web pages and information thereon, in the form of tables, text and graphics, web links and the source code for such information, is subject to change by the web page proprietor without notice. While the changed web page may still be considered to be essentially the same web page, even a difference in one piece of information may be crucial to a particular user. If such information is changed, it may be forever lost to the user.

Accordingly, there is a need for a process and system for enabling a user to store various versions of the same web page in order to save information which is subject to change by the web page proprietor.

Bearing in mind the problems and deficiencies of the prior art, it is therefore an object of the present invention to provide a process and system for storing different versions of the same web page accessed from an inter- or intra-net source in a client computer program storage device.

It is another object of the present invention to provide a process and system for storing such different web page versions which permits the user to keep track of the different versions.

A further object of the invention is to provide such a process and system for storing web page versions which enables the user to limit the number of different versions stored.

It is yet another object of the present invention to provide such a process and system which is integrated with a web browser bookmark file.

Still other objects and advantages of the invention will in part be obvious and will in part be apparent from the specification.

SUMMARY OF THE INVENTION

The above and other objects and advantages, which will be apparent to one of skill in the art, are achieved in the present invention which is directed to, in a first aspect, a process for storing web pages accessed from an inter- or intra-net source in a client computer program storage device. First, a client computer accesses a desired web page from an inter- or intra-net source, assigns a first version number to the desired web page and stores the desired (and preferably entire) web page and version number in a program storage device accessible by the client computer. At a later time the client computer re-accesses the desired web page from the inter- or intra-net source, assigning a second version number to the re-accessed desired web page and stores the re-accessed desired (and preferably entire) web page and second version number in the program storage device. There is then created a reference table which includes the first and second version numbers, such that the desired stored web pages may be accessed and viewed by the client computer by reference to the version numbers.

Preferably, the stored web pages include information such as a HTML source file for the web page, graphics imbedded in the HTML source file, javascript code, Java code and any other code referenced by the HTML source file. The invention is most useful for storing different versions of the same web page.

The client computer may include a web browser having a bookmark file for storage of URL addresses of a plurality of web pages including the desired web page. The bookmark file is operable with the web browser to identify and access a selected one of the web pages. The reference table may be created in conjunction with the bookmark file for access through the bookmark file to the desired stored web page.

At a later time, the desired web page may be repeatedly re-accessed from the inter- or intra-net source, wherein there will be assigned a different version number to the re-accessed desired web page each time. The different version number may be sequentially higher or lower than the version number of the previous version number assigned. The again re-accessed desired web pages are stored and assigned different version numbers in the program storage device accessible by the client computer, until a predetermined maximum version number is reached. Once the predetermined maximum version number is reached, a previous version of the desired web page may be deleted from the program storage device and the different version numbers may be reassigned to the remaining versions of the desired web page in sequential order that the versions were accessed and stored.

The version numbers may include designators of different files within the web page and designators of the version of the web page.

In another aspect, the present invention provides a process for accessing from a client computer different versions of a web pages accessed from an inter- or intra-net source. The process comprises storing in a program storage device accessible by the client computer different versions of a desired web page downloaded from an inter- or intra-net source. Each of the different versions of the web page has associated therewith a different version number. The different version numbers are organized in a reference table. A user at the client computer is able to view the reference table containing the different version numbers, select one of the version numbers from the reference table and view the version of the desired web page corresponding to the selected version number.

Preferably, the reference table is stored in a bookmark file of a web browser having storage of URL addresses of a plurality of web pages including the desired web page. The bookmark file is operable with the web browser to identify and access the selected version of the desired web page.

In a further aspect, the present invention provides a system for storing web pages accessed from an inter- or intra-net source. The system comprises a client computer program storage device having stored thereon a first version of a desired web page from an inter- or intra-net source having assigned thereto a first version number and a second version of the desired web page from an inter- or intra-net source having assigned thereto a second version number. The storage device also includes a reference table which includes the first and second version numbers, such that the desired web page version may be accessed and viewed by the client computer by reference to the version numbers. Each of the stored web pages may include information such as a HTML source file for the web page, graphics imbedded in the HTML source file, javascript code, Java code and any other code referenced by the HTML source file. The client computer storage device may include a web browser having a bookmark file for storage of URL addresses of a plurality of web pages including the desired web page. The bookmark file is operable in conjunction with the reference table by the web browser to identify and access a selected version of the web pages.

Preferably, the entire web pages are stored and the version numbers include designators of different files within the web page and designators of the version of the web page.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

DESCRIPTION OF THE PREFERRED EMBODIMENT(S)

Figure 1:
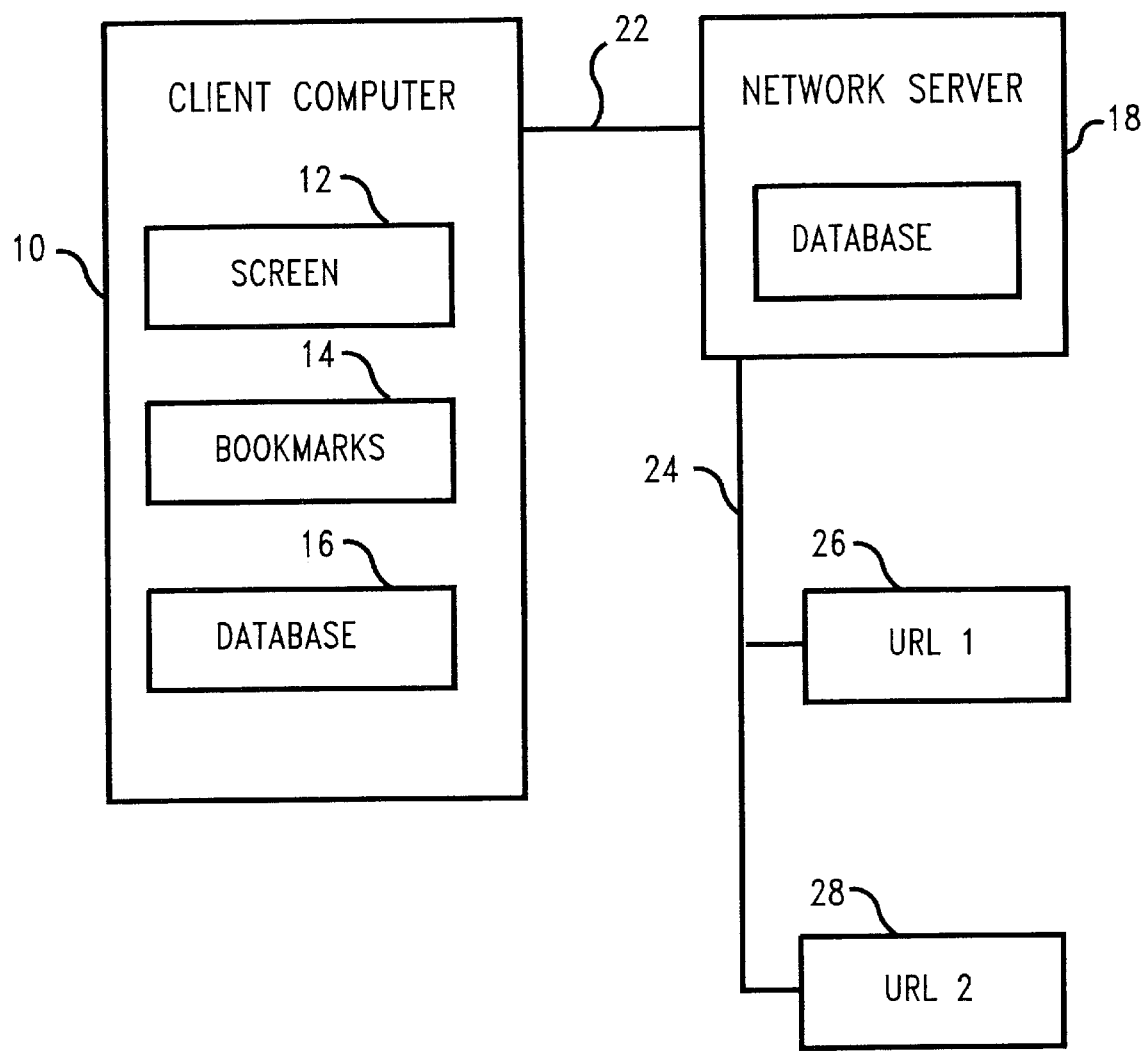
FIG. 1 is a schematic of the system of the present invention for storing different versions of the same web page accessed from an inter- or intra-net source in a client computer program storage device.

In describing the preferred embodiment of the present invention, reference will be made herein to FIGS. 1–4 of the drawings in which like numerals refer to like features of the invention. Features of the invention are not necessarily shown to scale in the drawings.

The invention provides a method and system by which a web page or URL may be stored in its different versions every time it is accessed from a source on an inter- or intra-net. The different versions of the same web page are available for viewing through the bookmark file of a client computer's web browser. This invention utilizes information from the network server in identifying the users of a particular web address.

The present invention provides an option of storing different versions of web source information from a URL on personal storage, then provides a seamless method to access the different versions of stored information by creating from the URL on personal storage. This would include storage of text data, graphic data files and any code used to generate the output of the URL on personal storage with pointers to the different versions of web URL addresses. This means that a user can select a URL from the standard bookmark file and be given the option of selecting different versions of URLs which would be accessed from personal storage.

Definitions relevant to the present invention are as follows:

HTML: Hypertext Markup Language

HTML source file: File with the HTML tags to be converted by a web browser to be displayed on a monitor URL (Uniform Resource Locator): A text string that indicates the server protocol to use in accessing the resource, the internet domain name of the server, and the name and location of the resource on that particular server Reference table: Table that contains the URL and the list of stored versions of the URLs Base number: A number that will be used for identifying the stored versions of the URLs and the included graphics. It is a unique number assigned to a URL and preferably includes a first suffix to differentiate each URL file within a particular version and a second suffix to differentiate each stored version. The graphics files may use this number together with a prefix of "G" to indicate graphic, a first suffix to differentiate each graphic file within a particular version and a second suffix to differentiate each stored version.

Level: The hierarchy of HTML files that are associated with a URL. When a web page is first accessed, it is at level 1. A first selection within the web page is at level 2. A second selection within the first selection is at level 3. For example, a level of 3 means that a URL is selected from an HTML file, another URL is selected when the first prior selected URL is presented then another URL is selected.

Personal storage: Storage to which the user at the client workstation has read and write access. The storage could include any program storage device such as the workstation hard drive and any other storage that the workstation has read and write access to.

Javascript code: Code that is usually included in the main HTML source file and is executed by the client when the HTML source file is viewed by the typical web browser.

Java code: Code that is referenced by a browser in an HTML source file and is sent to the browser, to be executed by the client, when the HTML source file that contains the java source reference, is executed by the typical web browser.

Other language code: Code which can be in a plurality of languages, that is referenced by a browser in an HTML source file and is sent to the browser, to be executed by the client, when the HTML source file that contains the other language source reference, is executed by the typical web browser.

Frames: A process that divides the screen into separate windows when an HTML source file is formatted and viewed by a browser.

A typical client/network system is illustrated in FIG. 1. Client computer 10 is linked by telephone or other network cable 22 to a network server computer 18. Such server or database may be on the Internet or on an intra-net system. Client computer 10 has a microprocessor for executing stored programs and includes first and second databases 14, 16, respectively, on its program storage device for storage of addresses of HTML web pages and other files which may be downloaded from a network service provider. Database 14 is conventionally referred to as a bookmark database, having addresses of often-used web pages or files 26, 28 having different addresses (URLs) and accessible 24 through network server 18. Bookmark database 14 also may reference the different version numbers of the same web page, whose address is stored in the bookmark file, if such web page versions are stored in accordance with the present invention. As will be explained further, database 16 contains the different versions of the web pages stored by the client computer, as well as the reference table which tracks the various web page versions stored. Preferably, both databases 14, 16 are physically present in the client computers, but they may be located elsewhere, so long as the client computer has access to the information therein. A screen 12 is able to display the desired web pages or other files accessed from the network.

The computer program or software incorporating the process steps and instructions described further below may be stored in both the client computer(s) and network server on an otherwise conventional program storage device, such as a semiconductor chip, a read-only memory, or magnetic media such as a diskette or computer hard drive, which is readable and executable by a computer in conjunction with a web browser such as Netscape Navigator.

Figure 2:
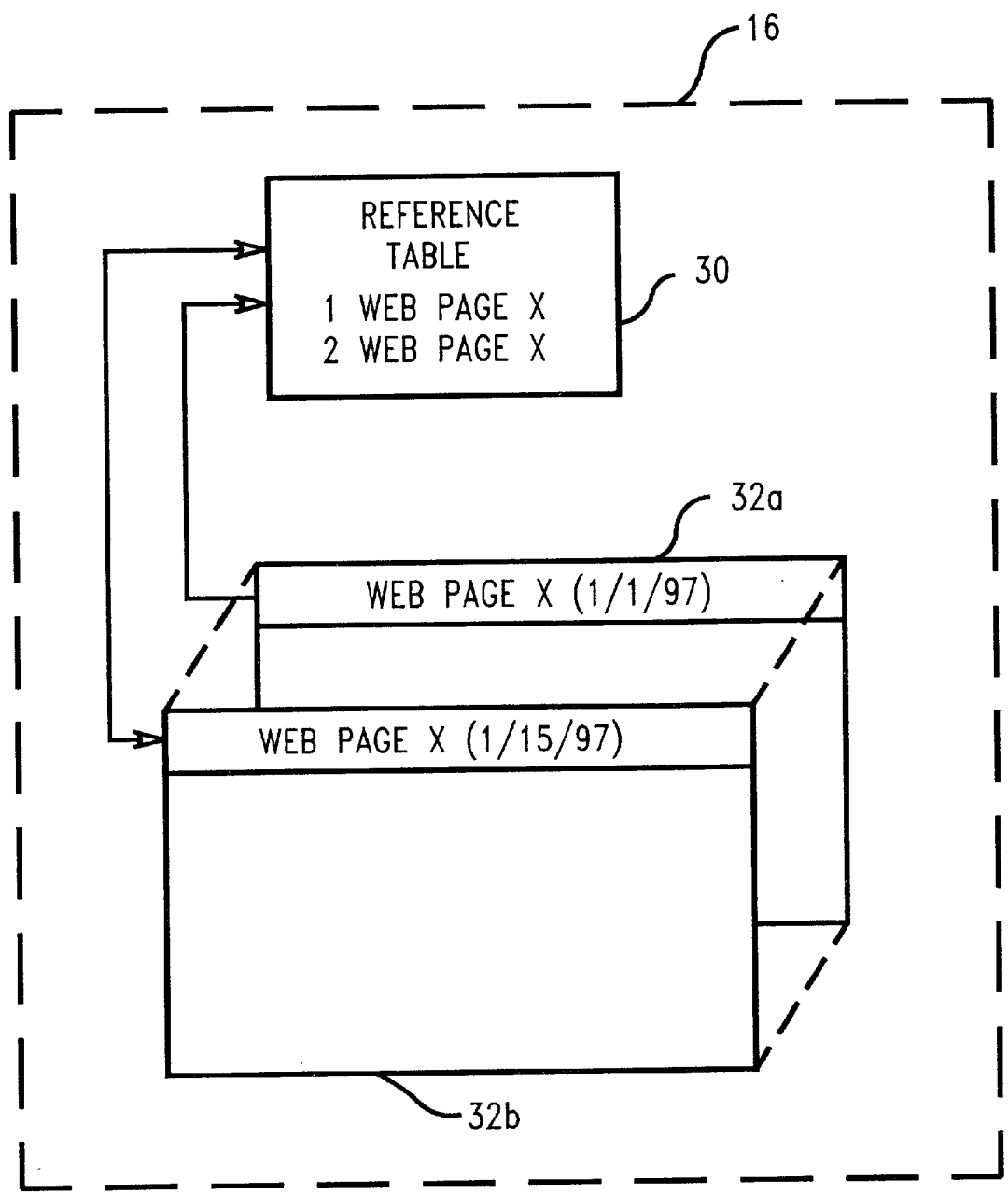
FIG. 2 shows two different versions of the same web page and reference table as stored in a database by the present invention.

FIG. 2 shows different versions of the same web page x as they are stored by the present invention. For example, on Jan. 1, 1997, the client computer accessed web page X 32a and decided to store the web page as it existed on that date. Database 16 contains the stored files to build web page X 32a, including the HTML source file for the web page, text, graphics and tables graphics imbedded in the HTML source file, javascript code, Java code and any other code referenced by the HTML source file. At a later time, for example, Jan. 15, 1997, the client computer again accessed web page X 32b, which now contained different information from the previous version 32a. Database 16 then stored the files to build web page 32b.

To keep track of the different web page versions, a reference table is included in database 16. Although the initial web page 32a was originally assigned a base number 1 in the reference table, upon storage of the later web page version 32b, base number 1 was assigned to the newer web page version 32b, and the older web page version 32a was reassigned sequentially higher base number 2. Such reassignment of base numbers as newer versions of the same web page are stored continuously until a predetermined maximum number of versions are stored. At that time, the oldest versions of the web page are deleted from database 16 as the base numbers are reassigned and the web page versions stored.

Preferably, the base number is able to differentiate each URL file within a particular version, as well as differentiate each particular version. More preferably, it includes a first suffix to differentiate each URL file within a particular version and a second suffix to differentiate each stored version. The graphics files may use this number together with a prefix of "G" to indicate graphic, a first suffix to differentiate each graphic file within a particular version and a second suffix to differentiate each stored version.

By way of example, one may consider the following URL:

http://www.ibm.com/test.html wherein it is assumed that "test.html" contains graphic files red.gif and flag.gif, the base number is 12345, fs is the first suffix and equals 01, 02, 03, and ss is the second suffix and equals 12. In this example, fs values 01, 02 and 03 will be used to name test.html, red.gif and flag.gif, respectively, and the ss value will be 12, indication that this is the twelfth version stored. In this case the filename for test.html would become:

123450112 the filename for red.gif would become:

G123450212 and the filename for flag.gif would become:

G123450312

If the versions were stored on a computer hard drive D, then the URL for verion 12 of http://www.ibm.com/test.html would be:

file:///d:\123450112

The URL of red.gif and flag.gif contained within http://www.ibm.com/test.html would be, respectively, file:///d:\G123450212 and file:///d:\G123450312 in the file named 123450112.

Figure 3:
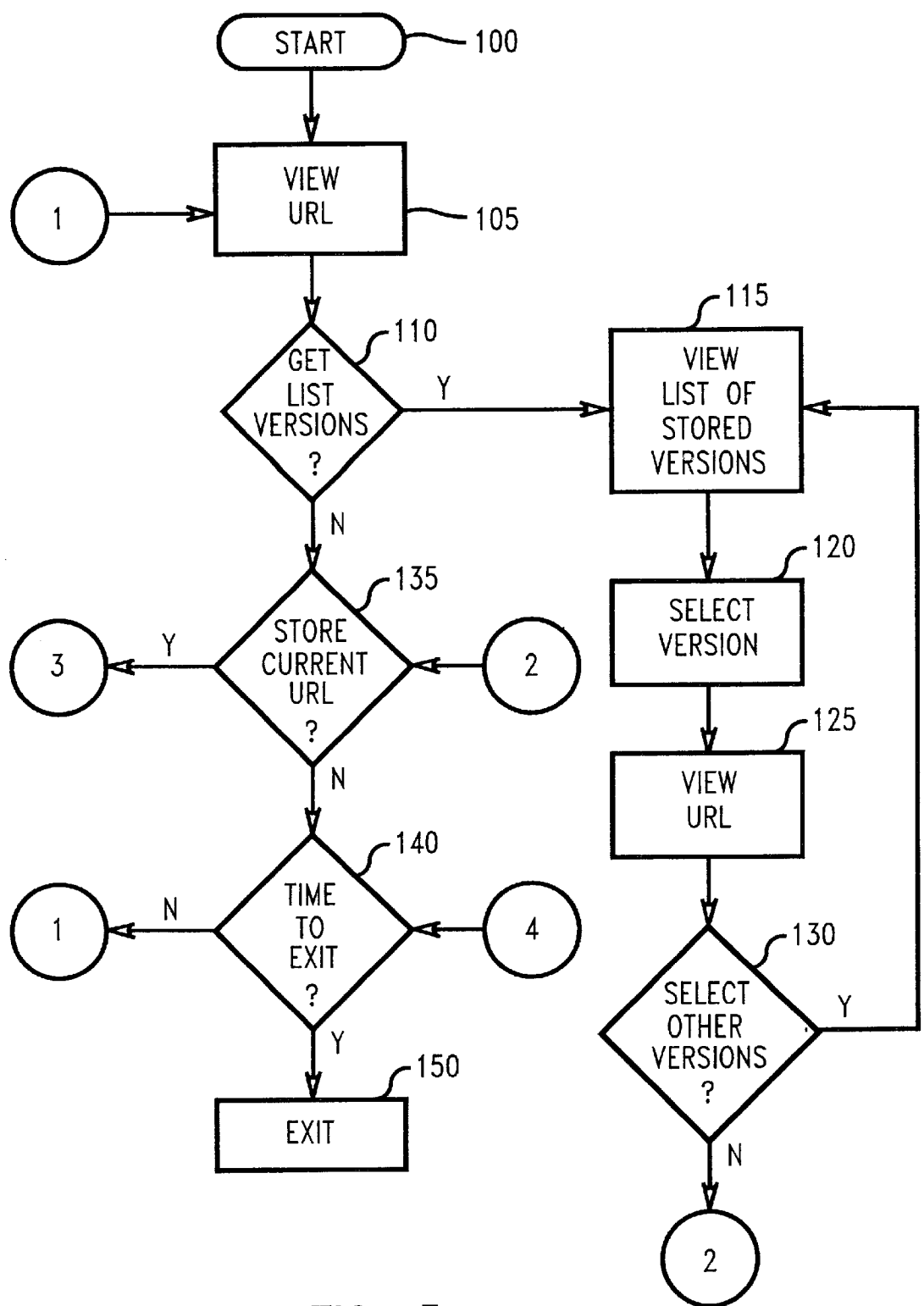
FIGS. 3 and 4 are block diagram flow charts of the preferred steps employed in practicing the present invention, wherein circled numerals indicate links between the steps.
Figure 4:
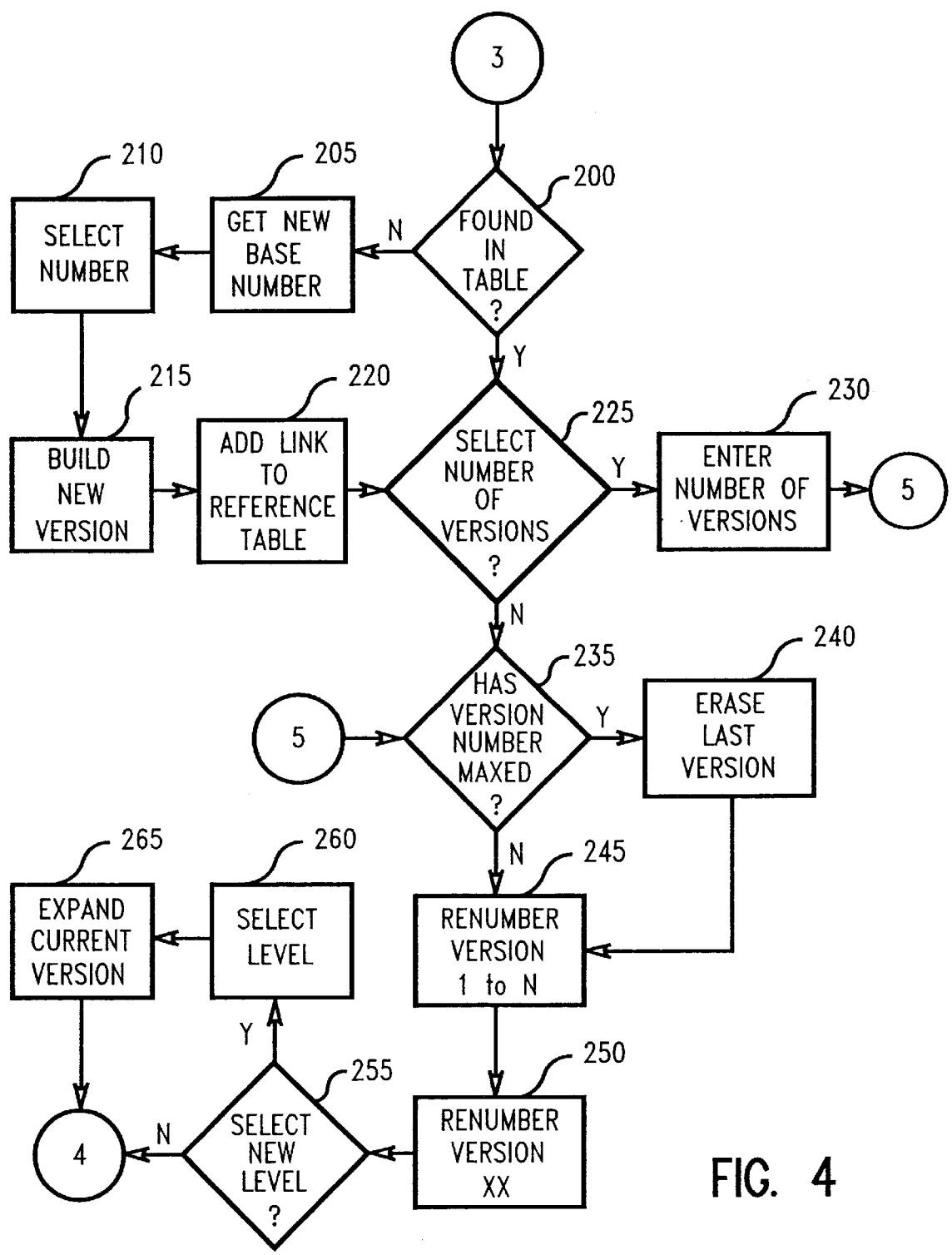

Flow charts of the process used in the present invention are shown in FIGS. 3 and 4. Numerals in circles indicate connections to and from other parts of the flow chart. The flow chart description is as follows:

100 Start the process.
105 View the URL.
110 Get list versions? Do we want to see the list of stored versions of this particular URL?
115 View list of stored versions. View the list of stored versions for this URL.
120 Select version. Select the version of the URL that we wish to view.
125 View URL. View the URL of a stored version of the originally selected URL.
130 Select other versions? Do we want to select another version of the originally selected URL?
135 Store current URL? Do we want to store the originally selected URL?
140 Time to exit? Do we want to exit the process.
150 Exit. Exit the process.
200 Found in table? Does the URL exist in the reference table?
205 Get new base number. Get a new base number for numbering the data in the stored URL.
210 Select level. Select the level of the stored version.
215 Build new version. This step takes the URL, HTML source file, all of the graphics embedded in the HTML source file, any frames referenced in the HTML source file, javascript code, java code and any other codes referenced by the HTML source code and copies the files to personal storage and names the individual files with the base number. This version will be created as a version xx, and will include all files for the selected level.
220 Add URL to reference. A new URL will be added to the reference table that is based on the new version that has just been built.
225 Select number of versions? Do we want to select the number of versions to store?
230 Enter number of versions.
235 Has version number maxed? Has the total number of versions allowed for this particular URL been reached?
240 Erase last version. Remove all of the files stored on personal storage for the last version of this particular URL.
245 Renumber version 1 to N. Renumber all of the remaining versions so that 1 becomes 2, 2 becomes 3, 3 and becomes 4, etc. This includes renumbering all of the suffixes for all of the files for each version. This includes renumbering the reference table.
250 Renumber version xx. Renumber the recently created xx version to version 1. Renumber all of the suffixes for all of the files for each version. This includes renumbering the reference table.
255 Select new level? Do we want to select a new level?
260 Select level. Enter the level requested for this particular URL.
265 Expand current version. Expand or contract the current version of this URL. Expanding the current version means that for each new level this step takes the URL, HTML source file, all of the graphics embedded in the HTML source file, any frames referenced in the HTML source file, javascript code, java code and any other code referenced by the HTML source code and copies the files to personal storage and names the individual files with the base number.

Thus, the present invention provide a useful process and system for storing different versions of the same web page accessed from an inter- or intra-net source in a client computer program storage device. The process and system permits the user to keep track of the different web page versions stored and to limit the number of different versions stored. Such a process and system may further be integrated with an existing web browser bookmark file.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A process for storing web pages accessed from an inter- or intra-net source in a client computer program storage device comprising the steps of:
  a) accessing at a client computer a desired web page from an inter- or intra-net source;
  b) assigning a first version number to said desired web page;
  c) storing said desired web page and version number in a program storage device of said client computer accessible by said client computer;
  d) at a time later than step (a), re-accessing at said client computer a different version of the same said desired web page from said inter- or intra-net source;
  e) assigning a second version number to the re-accessed desired web page;
  f) storing said re-accessed desired web page and second version number in said program storage device of said client computer accessible by said client computer; and
  g) creating a reference table within said program storage device of said client computer which includes said first and second version numbers, whereby the desired web page stored in steps (c) and (f) may be accessed and viewed by said client computer by reference to said version numbers.

2. The process of claim 1 wherein said storing of the web page in steps (c) and (f) includes storing information from said web pages selected from the group consisting of a HTML source file for said web page, graphics imbedded in said HTML source file, javascript code, Java code and any other code referenced by said HTML source file.

3. The process of claim 1 wherein said client computer includes a web browser having a bookmark file for storage of URL addresses of a plurality of web pages including said desired web page, said bookmark file being operable with said web browser to identify and access a selected one of said web pages, and wherein said step (g) includes creating said reference table in conjunction with said bookmark file for access through said bookmark file to the desired web page stored in steps (c) and (f).

4. The process of claim 1 further including the steps of:
  i) at a time later than the previous step of re-accessing said desired web page, again re-accessing at said client computer said desired web page from said inter- or intra-net source;
  ii) assigning a different version number to the again re-accessed desired web page, said different version number being sequentially higher or lower than the version number of the previous version number assigned;
  iii) repeating steps (i) to (ii);
  iv) storing said again re-accessed desired web pages and assigned different version numbers in said program storage device of said client computer accessible by said client computer.

5. The process of claim 4 wherein in step (iv) said again re-accessed desired web pages and assigned different version numbers in said program storage device of said client computer accessible by said client computer are stored until a predetermined maximum version number is reached.

6. The process of claim 5 further including the step of:
  v) once said predetermined maximum version number is reached, deleting from said program storage device of said client computer a previous version of said desired web page; and
  vi) reassigning said different version numbers to the remaining versions of said desired web page in sequential order that the versions were accessed and stored.

7. The process of claim 1 wherein the web page stored in steps (c) and (f) is the entire web page.

8. The process of claim 1 wherein steps (b) and (e) include assigning version numbers which include designators of different files within said web page and designators of the version of said web page.

9. A process for storing web pages accessed from an inter- or intra-net source in a client computer program storage device comprising the steps of:
  a) accessing at a client computer a desired web page from an inter- or intra-net source;
  b) assigning a first version number to said desired web page;
  c) storing said desired web page and version number in a program storage device of said client computer accessible by said client computer, the stored desired web page including information selected from the group consisting of a HTML source file for said web page, graphics imbedded in said HTML source file, javascript code, Java code and any other code referenced by said HTML source file;
  d) at a time later than step (a), re-accessing at said client computer said desired web page from said inter- or intra-net source, the re-accessed desired web page being a different version of said desired web page accessed in step (a);
  e) assigning a second version number to the re-accessed desired web page;
  f) storing said re-accessed desired web page and second version number in said program storage device of said client computer, the stored re-accessed desired web page including information selected from the group consisting of a HTML source file for said web page, graphics imbedded in said HTML source file, javascript code, Java code and any other code referenced by said HTML source file; and
  g) creating a reference table within said program storage device of said client computer which includes said first and second version numbers, whereby the desired web page stored in steps (c) and (f) may be accessed and viewed by said client computer by reference to said version numbers.

10. The process of claim 9 wherein said client computer includes a web browser having a bookmark file for storage of URL addresses of a plurality of web pages including said desired web page, said bookmark file being operable with said web browser to identify and access a selected one of said web pages, and wherein said step (g) includes creating said reference table in conjunction with said bookmark file for access through said bookmark file to the desired web page stored in steps (c) and (f).

11. The process of claim 9 further including the steps of:
   i) at a time later than the previous step of re-accessing said desired web page, again re-accessing at said client computer said desired web page from said inter- or intra-net source;
   ii) assigning a different version number to the again re-accessed desired web page, said different version number being sequentially higher or lower than the version number of the previous version number assigned;
   iii) repeating steps (i) to (ii);
   iv) storing said again re-accessed desired web pages and assigned different version numbers in said program storage device of said client computer accessible by said client computer.

12. The process of claim 11 wherein in step (iv) said again re-accessed desired web pages and assigned different version numbers in said program storage device of said client computer accessible by said client computer are stored until a predetermined maximum version number is reached.

13. The process of claim 12 further including the step of:
   v) once said predetermined maximum version number is reached, deleting from said program storage device of said client computer a previous version of said desired web page; and
   vi) reassigning said different version numbers to the remaining versions of said desired web, page in sequential order that the versions were accessed and stored.

14. A process for accessing from a client computer different versions of a web page accessed from an inter- or intra-net source comprising the steps of:
   a) storing in a program storage device of said client computer accessible by said client computer different versions of a same desired web page downloaded from an inter- or intra-net source, each of said different versions of said web page having associated therewith a different version number, the different version numbers being organized in a reference table within said program storage device of said client computer;
   b) viewing at said client computer said reference table within said program storage device of said client computer containing said different version numbers;
   c) selecting one of said version numbers from said reference table within said program storage device of said client computer; and
   d) viewing at said client computer the version of said desired web page corresponding to the selected version number.

15. The process of claim 14 wherein said reference table is stored in a bookmark file of a web browser, said bookmark file having storage of URL addresses of a plurality of web pages including said desired web page, said bookmark file being operable with said web browser to identify and access the selected version said desired web page.

16. A system for storing web pages accessed from an inter- or intra-net source comprising a client computer program storage device within said client computer having stored thereon a first version of a desired web page from an inter- or intra-net source having assigned thereto a first version number, a second, different version of the same said desired web page from an inter- or intra-net source having assigned thereto a second version number, and a reference table which includes said first and second version numbers, whereby the desired web page version may be accessed and viewed by said client computer by reference to said version numbers.

17. The system of claim 16 wherein the each of the stored web pages include information selected from the group consisting of a HTML source file for the web page, graphics imbedded in said HTML source file, javascript code, Java code and any other code referenced by said HTML source file.

18. The system of claim 16 wherein said client computer storage device within said client computer includes a web browser having a bookmark file for storage of URL addresses of a plurality web pages including the desired web page, said bookmark file being operable in conjunction with said reference table by said web browser to identify and access a selected version of said web pages.

19. The system of claim 16 wherein the entire web pages are stored.

20. The system of claim 16 wherein said version numbers include designators of different files within said web page and designators of the version of said web page.

* * * * *